United States Patent Office 3,630,959
Patented Dec. 28, 1971

3,630,959
CARBONIZATION OF BITUMINOUS COALS
Oliver A. Kiikka, Willoughby, Ohio, assignor to The Standard Oil Company, Cleveland, Ohio
No Drawing. Filed June 4, 1969, Ser. No. 830,509
Int. Cl. C01b *31/08*
U.S. Cl. 252—422        4 Claims

ABSTRACT OF THE DISCLOSURE

Carbonization of bituminous coal wherein the coal is acidified with a liquid sulfonating agent such as sulfuric acid or oleum and thereafter carbonized by heating to a temperature in the range of 600° C. to 900° C., the heating rate in the temperature range of 400° C. to 600° C. being in excess of 10° C. per minute. The acidified coal is preferably deacidified prior to carbonization by heating at a temperature in the range of 400° F. to 700° F. with or without a sweeping airstream. Acid treatment of the bituminous coals permits carbonization thereof at an accelerated rate without caking during heating through the temperature range of 400° C. to 600° C.

BACKGROUND OF THE INVENTION

It is well-known that certain carbon materials, such as bituminous coals and some subbituminous coals, fuse into a solid mass when heated to or past the "fusion point." This phenomenon is a characteristic of the "caking" coals which are especially useful for the manufacture of metallurgical coke and of active carbon despite the fact that special precautions must be taken during carbonization to traverse the fusion zone. The caking coals, referred to generally as bituminous coal, contain roughly 60 to 80 percent fixed carbon and 40 to 20 percent volatile matter and provide a heating value from about 10,000 to 15,000 B.t.u. per pound.

The instant invention relates to the manufacture of liquid-phase decolorizing and gas-adsorbing activated carbons using the above-identified coals as raw material. These activated carbons are useful in fixed bed, fluidized bed or powdered carbon applications and for certain specific applications such as the fabrication of electrode materials.

In the production of activated carbon the general method is first to carbonize the raw material in iron retorts at a temperature high enough to remove the volatile constituents but at the same time low enough to avoid cracking of the evolved gases, since it is well-known that the grey carbon deposited by the cracking of hydrocarbons at high temperatures cannot be activated. It is also desireable to conduct the heating in such a manner as to give the material sufficient time to evolve most of the volatile constituents at as low a temperature as practicable (400° to C. to 500° C. for 1 to 2 hours in the case of bituminous coals) and to follow this by heating to higher temperatures (600° C. to 650° C. for 2 to 4 hours) to free the material from more tightly bound volatile matter. These steps are usually referred to as "carbonization," the carobnized material so obtained is reduced to a fairly coarse mesh size of 6 to 10 mesh and then activated, usually by passing steam over it at a temperature of 800° C. to 1000° C.

To tailor the density of the activated carbon it is sometimes desirable to compact the raw material, prior to carbonization, in the arm of small briquettes with the aid of a binder. This is particularly desirable with a high-volatile coal to avoid getting a bulky and porous material upon carbonization. During carbonization, the temperature is raised at a rate of about 2° C. every minute through the fusion zone until the desired temperature is reached. Although carbonization is carried out either in horizontal tunnel kilns, vertical retorts, or horizontal rotary kilns where continuous agitation of the material is provided, a higher rate of heating will cause caking of the material into a fused mass. The general practice has been, where the coal contains more than 10 percent volatile matter, a preliminary carbonization is usually given the material which effectively removes substantially all of the volatile matter prior to briquetting with a binder. This permits a higher heating rate of the briquettes during carbonization, since the volatile matter, generally regarded as being the plasticizing agent which aids fusion of the material, is no longer present.

The carbonized briquettes are then ground and activated with steam or flue gas in conventional activating retorts or in multiple hearth furnaces. The grinding step prior to activation is usually carried out so as to yield a particulate material in the desired size range. This is impractical where finely ground material is required, as losses increase, and it is conventional to grind coarse activated material to the required finer mesh sizes. Yields from the instant overall process are in the range from about 20 to 50 percent by weight of the moisture-free raw material charged to the plant.

At the present time, typical industry heating rates of preliminarily carbonized material range from about 10° C. per minute to 15° C. per minute. Acidification, as described in the instant invention, permits such a heating rate, or higher, without preliminary carbonization at the same time improving the yield of product.

It is well accepted that in order that a true coke should be formed by a carbonization process, fluidity of the plasticized fusible coal matrix must persist long enough during the heating period to permit the coal to become compacted into a fused mass before decomposition proceeds to a point when the whole solidifies to semi-coke. (See Kirk-Othmer Encyclopedia of Chemical Technology, Second Edition, Volume V, page 644, Interscience Publishers, New York.) The slow rate of heating in the carbonization step is predicted upon obtaining the desired degree of fluidity in the particulate material without effecting fusion of the entire mass. It is a central feature of the instant invention that, as far as can be determined at this time, carbonization is effected without the necessity of maintaining fluidity of the plasticized fusible coal matrix or, in any event, maintaining the fluidity of the plasticized coal matrix for so short a time as to circumvent the risk of fusing the entire mass.

It was unexpectedly discovered that pretreatment of a particulate bituminous coal material with a liquid sulfoxidizing agent such as sulfuric acid or oleum permits carbonization several times faster than any presently known rate, with no danger of coring or caking when the fusion zone is reached and traversed.

U.S. Pat. No. 2,382,334 describes a process for the preparation of cation exchange materials by sulfonating wood, lignite, peat, bituminous coal and similar materials with a concentrated liquid sulfonating agent, thereafter washing and drying this product and re-sulfonating with sulfur trioxide gas. When the sulfonation method of U.S. Pat. No. 2,382,334 is applied to asphalt-type bituminous materials such as asphaltines, gilsonite, blown asphalt and other related bituminous materials, the exchange capacity of the sulfonated product is always slightly higher than that of the once-sulfonated material. This process is distinguished from that described in the instant application mainly by the fact that the latter does not yield cation exchange materials.

U.S. Pat. No. 2,809,938 discloses a process for producing new and improved activable chars and activated carbons from asphalt-type bituminous materials. These examples include gilsonite, grahamite, wurtzilite, native asphalts and the like, and materials unlike bituminous coals, which are not raw materials used in the process of the instant invention.

SUMMARY OF THE INVENTION

It is an object of the instant invention to use bituminous and subbituminous coals as raw material for the manufacture of carbonized coal in a predetermined size range at an accelerated rate by acid pretreatment of the raw material with a liquid sulfonating agent.

It is a further object of the instant invention to provide a concentrated sulfuric acid pretreatment to permit carbonziation of bituminous coal at a rate in excess of 10° C. per minute without coring.

It is another object of the instant invention to utilize a predetermined size range of particulate bituminous coal with a heating value in the range of 10,000 to 15,000 B.t.u. per pound for the manufacture of an activated carbon, in a predetermined size range, with an unexpectedly high yield, by acid pretreatment of relatively water-free raw material with sufficient liquid sulfonating agent to condition the raw material without losing its particulate, free-flowing nature.

It is a still further object of the instant invention to provide an accelerated carbonization process for the conversion of particulate bituminous coal to activated carbon in high yields, in excess of 40 percent by weight of moisture-free raw material charged, at the same time permitting recovery of a major portion of the sulfonating agent used.

PREFERRED EMBODIMENT OF THE INVENTION

In accordance with the present invention I have discovered that bituminous coals which fuse when carbonized, unless heated through the fusion zone at a very slow rate, may be rapidly converted into activated carbon in essentially two steps. The first step comprises contacting the particulate bituminous coal, preferably in the size range from about 10 mesh or smaller, with sufficient concentrated sulfuric acid to impart to it the unobvious characteristics which permit said particulate coal to be heated through the fusion zone without fusing, but not so much acid as to permit the particulate material to lose its free-flowing characteristic. Normally the amount of sulfuric acid used will be less than an equal weight but more than 15 percent of the coal to be treated. Larger quantities of acid do not appear to be detrimental and may be used except that there is no economic merit in doing so.

The time of treatment will vary depending on the size of the particulate material to be treated and the amount of agitation provided for a given weight ratio of raw material to acid.

Any strong sulfonating agent will suffice but preferred sulfonating agents are concentrated or fuming sulfuric acid, chlorosulfonic acid and the like. Most preferred is concentrated sulfuric acid, particularly that obtained as the used acid from a conventional sulfuric acid alkylation unit in a pertroleum refinery.

The second step comprises heating the acid-treated coal past its fusion zone at a rate in excess of 10° C. per minute and, after carbonization is complete, introducing oxidizing gases into the hot particulate mass to activate the material.

It is most preferred that, after acid-treatment, the particulate material be heat-soaked at an elevated temperature lower than the decomposition temperature of the acid, for a period of from 10 minutes to about 3 hours depending on th size of the particles and on the temperature chosen. For a mash size smaller than 100 Tyler mesh, 1 hours at 100° C. is satisfactory. This heat-soaking treatment appears to favor uniform characteristics, particularly density.

It is preferred that the particulate coal be contacted with relatively cool acid as there is considerable heat generated. To ease the problem of heat generation it is desirable to remove as much loosely bound moisture as possible, particularly if the coal appears to be wet. An advantage of using spent alkylation acid is that there is very little heat generated, especially when compared with the amount of heat generated if oleum is used. It will be apparent to those skilled in the art that contacting coal with hot acid would be feasible if suitable heat transfer means were provided to control the heat released.

The acidified material is preferably deacidified prior to heating through the fusion zone to effect carbonization. Deacidification of the material is not essential prior to the activation step though it is desirable from an economic viewpoint. Deacidification is preferably carried out in the range from about 400° F. to 700° F., with or without a sweeping airstream, during which substantially all the excess sulfuric acid is driven off and may be recovered for reuse. It is most preferred that deacidification be effected in the presence of air using from about 0.1 to 10 s.c.f.h. air per pound of material. After deacidification is completed the temperature is increased at a rate in excess of 10° C. per minute until past the fusion zone of from about 400° C. to 600° C., to a carbonization temperature in the range of from about 600° C. to 900° C. It is most preferred that the deacidification and the carbonization be carried out in a horizontal rotary kiln. The bulk density of the carbonized product is preferably within the range of about 0.45 gram per cc. to about 0.75 gram per cc.

For particular uses where an active carbon is required in the form of a hard, dense granular particle in the size range of from about 1 to 8 mm., the carbonized particles may be cooled and mixed with acid sludge to form wet green globs or prills which may be further dried, sintered, and activated to yield rounded active carbon particles or prills in the desired size range according to a process more fully described in copending patent application, Ser. No. 773,966, filed Nov. 6, 1968.

It was discovered that acid-pretreated carbonized particles, formed into wet green globs prior to the formation of the active prills, provide surprisingly high yields which directly affects the profitability of the process.

In the following examples, all "parts" are parts by weight, unless specifically indicated otherwise.

EXAMPLE 1

Roda coal, which is a low-ash Class A bituminous coking coal, was crushed and then sieved to a 20 x 70 mesh size (average particle diameter of 538 microns). 490 parts coal were mixed with 329 parts concentrated sulfuric acid for 3 minutes in a mixer and heat-soaked in a forced draft oven for 1 hour at 100° C. The digested particles were removed from the forced draft oven; an inspection showed they were substantially dry to the touch and were free-flowing. The digested particles were then placed in the oven at 600° F. for 1½ hours sweeping with 1 s.c.f.h. air per pound of digested coal. At the end of the heating period 492 grams of dried material, substantially free of acid were recovered. The acid vapors were trapped in an acid-vapor collection system. Analysis of the raw material was 0.62 percent sulfur, while that of the acid-heated, dried material was 2.80 percent sulfur. After deacidification was completed the temperature was increased at a rate in excess of 10° C. per minute until past the fusion zone of from about 400° C. to 600° C., to a carbonization temperature in the range of from about 600° C. to 900° C. The material was removed from the oven, placed in an activation chamber, and activated at 980° C. with steam and nitrogen.

EXAMPLES 2 AND 3

300 parts of 100 x 140 mesh Roda coal were digested with 300 parts concentrated sulfuric acid in a mixer for 3 minutes and mixing was continued when the mixture was placed in a forced draft oven for 1 hour at 100° C. The yield of digested product was 546 parts. The digested product was free-flowing and felt dry to the touch. The digested product was placed in a furnace at 600° F. for 1 hour using no stripping gases. At the end of an hour substantially all the excess acid vapors were driven off and the yield of dried product was 352.3 parts. After deacidification was completed the temperature was increased at a rate in excess of 10° C. per minute until past the fusion zone of from about 400° C. to 600° C., to a carbonization temperature in the range of from about 600° C. to 900° C. The carbonized product was then activated at 980° C., activation temperature having been reached from 600° F. (315.6° C.) to 980° C. in less than 30 minutes. Activation time for each batch enumerated herein below varied and the results of the activated product under the particular conditions of activation are listed immediately following.

|  | Example 2 | Example 3 |
|---|---|---|
| Activation charge, grams | 100 | 100 |
| Activation time, minutes | 90 | 80 |
| Activation temperature, °C | 980 | 980 |
| Approximate bulk density of charge, gm./cc* | 0.655 | 0.655 |
| Steam to reactor, gms./hr | 100 | 100 |
| Yield/100 gms. charged | 34.9 | 36.2 |
| Overall yield, lbs/100 lbs. coal* | 41.4 | 43.0 |
| Weight percent $CCl_4$ adsorbed | 82.2 | 63.9 |
| Mesh distribution, weight percent: |  |  |
| +100 | 0.0 | 0.0 |
| 100-140 | 66.6 | 66.9 |
| 140-200 | 31.1 | 30.9 |
| <200 | 2.3 | 2.2 |

*Overall yield=(Yield/100 gms. carbonized coal charged) (118.7 lbs./ deacidified coal 1200 lbs.) coal.

EXAMPLES 4 TO 7

Roda coal was ground and sieved to produce a material in the mesh ranges of 10 to 14 and 20 to 45. 300 parts of each mesh size were mixed with 200 parts concentrated sulfuric acid for 3 minutes in a mixer and digestion was continued at 212° F. for 1 hour and 3 hours respectively. The digested product obtained in each of the above cases was dried at 600° F. for 1 hour using 1 s.c.f.h. air per pound of digested material. The results obtained upon drying are listed below. The amount of acid vapors recovered is not listed.

| Example | Digestion time, hrs. | Mesh size | Charge, gms. | Dried product, gms. | Lbs. deacidified coal per 100 lbs. coal | Approximate bulk density, gm./cc. |
|---|---|---|---|---|---|---|
| 4 | 1 | 10-14 | 250 | 157.3 | 104.4 | 0.505 |
| 5 | 1 | 20-45 | 247 | 160.9 | 107.3 | 0.590 |
| 6 | 3 | 10-14 | 243 | 160.3 | 111.8 | 0.559 |
| 7 | 3 | 20-45 | 250 | 144.0 | 98.0 | 0.561 |

EXAMPLES 8 AND 9

A portion of the products obtained from Examples 6 and 7 above was first carbonized by increasing the temperature at a rate in excess of 10° C. per minute until past the fusion zone of from about 400° C. to 600° C., to a carbonization temperature in the range of from about 600° C. to 900° C. and then was activated in the presence of steam and nitrogen with the results set forth immediately below in Examples 8 and 9 respectively.

|  | Example 8 | Example 9 |
|---|---|---|
| Mesh size | 10-14 | 20-45 |
| Activation temperature, °C | 980 | 980 |
| Activation time, minutes | 40 | 40 |
| Charge, grams | 100 | 100 |
| Steam, gms./hr | 100 | 100 |
| Nitrogen, s.c.f.h. | 4 | 4 |
| Yield/100 gms. charged | 56 | 58.7 |
| Overall yield, lbs./100 lbs. coal | 62.6 | 57.5 |
| Approximate bulk density, gm./cc | 0.461 | 0.566 |
| Weight percent $CCl_4$ adsorbed | 14.2 | 31.7 |

I claim:
1. A process for preparing an activated carbon which comprises

(a) contacting a fusible bituminous coal, having a heating value from about 10,000 to 15,000 B.t.u. per pound, with a liquid sulfonating agent in an amount not exceeding the weight of coal to be treated, for a period less than 2 hours at ambient temperatures and further digesting the treated material at 100° C. for a period of from 10 minutes to 3 hours, (b) heating the digested product at a temperature in the range from about 400° F. to 700° F. to recover the excess acid values from the digested product in the presence of from about 0.1 to 10 s.c.f.h. of air per pound of product, and (c) increasing the temperature at a rate in excess of 10° C. per minute until past the fusion zone of from about 400° C. to 600° C., a carbonization temperature in the range of from about 600° C. to 900° C and activating the carbonized product.

2. A process for preparing a particulate carbon material comprising (a) contacting substantially moisture-free bituminous coal particles in the size range from about 10 mesh or smaller with liquid sulfonating agent in an amount less than an equal weight but more than 15 percent by weight of coal so as to preserve the free-flowing characteristic of said particles at a temperature lower than the decomposition temperature of said liquid sulfonating agent for a period less than 2 hours, to provide an acidified product, (b) heating the acidified product in the range of from about 400° F. to 700° F. with a sweeping air stream of from about 0.1 to 10 s.c.f.h. of air per pound of material and then increasing the temperature of the thus deacidified product at a rate in excess of 10° C. per minute until past the fusion zone of from about 400° C. to 600° C., to a carbonization temperature in the range of from about 600° C. to 900° C., (c) recovering a carbonized product having an approximate bulk density from about 0.45 gram per cc. to about 0.75 grams per cc.

3. The process of claim 1 wherein the liquid sulfonating agent is concentrated sulfuric acid.

4. The process of claim 2 wherein the liquid sulfonating agent is concentrated sulfuric acid.

References Cited

UNITED STATES PATENTS

| 1,433,039 | 10/1922 | Rodman | 252—421 |
| 1,641,281 | 9/1927 | Lueg | 252—422 |
| 2,040,931 | 5/1936 | Fuchs | 252—421 |
| 2,339,742 | 1/1944 | Fuchs | 252—421 |
| 2,595,365 | 5/1952 | Odell et al. | 252—421 X |
| 2,998,375 | 8/1961 | Petersen et al. | 201—7 |
| 3,248,303 | 4/1966 | Doying | 201—8 |

OTHER REFERENCES

Kirk-Othmer Encyclopedia of Chemical Technology, 2nd ed., 1964, vol. 4, pp. 400-407 and 420-422.

EDWARD J. MEROS, Primary Examiner

U.S. Cl. X.R.

23—209.2, 209.4; 201—8; 252—421, 445